(12) United States Patent (10) Patent No.: US 12,586,141 B2
Kawaguchi (45) Date of Patent: Mar. 24, 2026

(54) NFT ISSUING SYSTEM

(71) Applicant: Nomura Research Institute, Ltd., Tokyo (JP)

(72) Inventor: Masashi Kawaguchi, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 113 days.

(21) Appl. No.: 18/529,477

(22) Filed: Dec. 5, 2023

(65) Prior Publication Data

US 2024/0202849 A1 Jun. 20, 2024

(30) Foreign Application Priority Data

Dec. 19, 2022 (JP) .................................. 2022-202238

(51) Int. Cl.
G06Q 50/18 (2012.01)

(52) U.S. Cl.
CPC .................................. G06Q 50/184 (2013.01)

(58) Field of Classification Search
CPC .................................................... G06Q 50/184
See application file for complete search history.

(56) References Cited

U.S. PATENT DOCUMENTS 11,244,032 B1 * 2/2022 Nguyen ................... G06F 9/547
11,496,308 B1 * 11/2022 Khan ................... G06Q 20/065

2022/0405066 A1 * 12/2022 McDonald ............. G06N 20/00
2023/0043095 A1 * 2/2023 Milam ................... H04L 9/3247
2023/0267128 A1 * 8/2023 Fourrier ............. G06F 16/2237
                                                                707/736
2023/0342758 A1 * 10/2023 Bolcer ................... G06Q 30/06
2023/0401568 A1 * 12/2023 Jain ........................... H04L 9/50
2024/0070495 A1 * 2/2024 Satish ..................... G06F 40/56
2024/0160659 A1 * 5/2024 Richter ................. G06F 16/951
2025/0016011 A1 * 1/2025 Hamiel ................. H04L 9/3255
2025/0078048 A1 * 3/2025 Soylu ..................... G06Q 50/01
2025/0156828 A1 * 5/2025 Sliwka ................. G06Q 20/123

FOREIGN PATENT DOCUMENTS

KR 2023090887 A * 6/2023 ............. G06N 20/00
KR 2023169515 A * 12/2023

OTHER PUBLICATIONS

Artificially Intelligent Marketplaces, Ruiqi Lin, INSEAD, The Business School for the World (Year: 2022).*
Combination of Blockchain and AI for Music Intellectual Property Protection, Na Ci, Hindawi, Computational Intelligence and Neuroscience, Mar. 28, 2022 (Year: 2022).*
Extended European Search Report (EESR) dated Apr. 18, 2024 for European Patent Application No. 23216651.2.

(Continued)

*Primary Examiner* — John W Hayes
(74) *Attorney, Agent, or Firm* — RANKIN, HILL & CLARK LLP

(57) ABSTRACT

An NFT issuing system that issues an NFT related to digital content generated by inference by AI, includes an NFT issuing unit that issues an NFT including information of a learned model used to generate the digital content and a parameter given to the learned model at the time of inference.

6 Claims, 3 Drawing Sheets

(56)     References Cited

OTHER PUBLICATIONS

Bandara et al., "Indy528—Federated Learning Model Tokenization with Non-Fungible Tokens(NFT) and Model Cards", IEEE 19th International Conference on Mobile Ad Hoc and Smart Systems (MASS), 2022, pp. 195-201; Cited in EESR.

Wadhwani et al., "Machine Learning Model Cards Transparency Review: Using model card toolkit", IEEE Pune Section International Conference (PUNECON), 2020, pp. 133-137; Cited in EESR.

Arikan et al., "Qualitative Study of Text-to-Image AI Generators and their Relationship with NFTs", IEEE International Conference on Computational Science and Computational Intelligence (CSCI), 2022, pp. 240-245; Cited in EESR.

* cited by examiner

FIG. 3

NFT ISSUING SYSTEM

BACKGROUND OF THE INVENTION

1. Technical Field

The present invention relates to a technology of storing and protecting digital content, and more particularly, to a technology effective for application to a non-fungible token (NFT) issuing system that issues an NFT associated with content.

2. Description of the Related Art

With the advancement of artificial intelligence (AI) technology, in recent years, there are systems, services, learned models, and the like that output digital content such as images/videos, stories, music/voices, games, and the like by AI with text, images, or some other digital data as an input (for example, "Stable Diffusion" (https://stablediffusion-web.com), "Novel AI" (https://novelai.net), and the like). Digital content output by such a system or the like may be sold on an NFT marketplace such as "Opensea (registered trademark)" (https://opensea.io) after being associated with an NFT to enable proof of ownership and original.

As a mechanism related to a technology of enabling transaction by associating an NFT with digital content, for example, Japanese Patent No. 7033352 discloses a mechanism in which putting-up registration is performed on the basis of digital art work information desired to be put up from a user, an ownership token related to the digital art work is issued, and the ownership token is put up in a blockchain network to be able to be traded, so that flowability of the digital art work is improved, a burden on an artist at the time of putting-up registration is reduced, and convenience is improved.

SUMMARY OF THE INVENTION

According to the related art, digital content can be treated as a transaction target that is unique on a blockchain such as an NFT marketplace.

However, the data itself of the digital content is stored in, for example, a distributed storage, a cloud storage, or the like, and a link to the data is embedded in the definition of the NFT (smart contract or the like), so that the digital content and the NFT are associated with each other. Therefore, the more the digital content is output and generated, the more the capacity of the storage is consumed.

Therefore, an object of the present invention is to provide an NFT issuing system that eliminates the need to store, in a storage, individual digital content output by using AI.

The above-described and other objects and novel features of the present invention will be clarified by the description herein and the attached drawings.

The outline of a representative invention of the inventions disclosed in the present application will be briefly described as follows.

An NFT issuing system that is a representative embodiment of the present invention is an NFT issuing system that issues an NFT related to digital content generated by inference by AI, the NFT including information of a learned model used to generate the digital content and a parameter given to the learned model at the time of inference.

The advantageous effect of the representative one of the inventions disclosed in the present application will be briefly described as follows.

That is, according to the representative embodiment of the present invention, it is possible to eliminate the need to store, in a storage, individual digital content output by using AI.

BRIEF DESCRIPTION OF THE DRAWINGS

FIG. 3 is a diagram illustrating an outline of an architecture according to an embodiment of the present invention.

DETAILED DESCRIPTION

Figure 1:
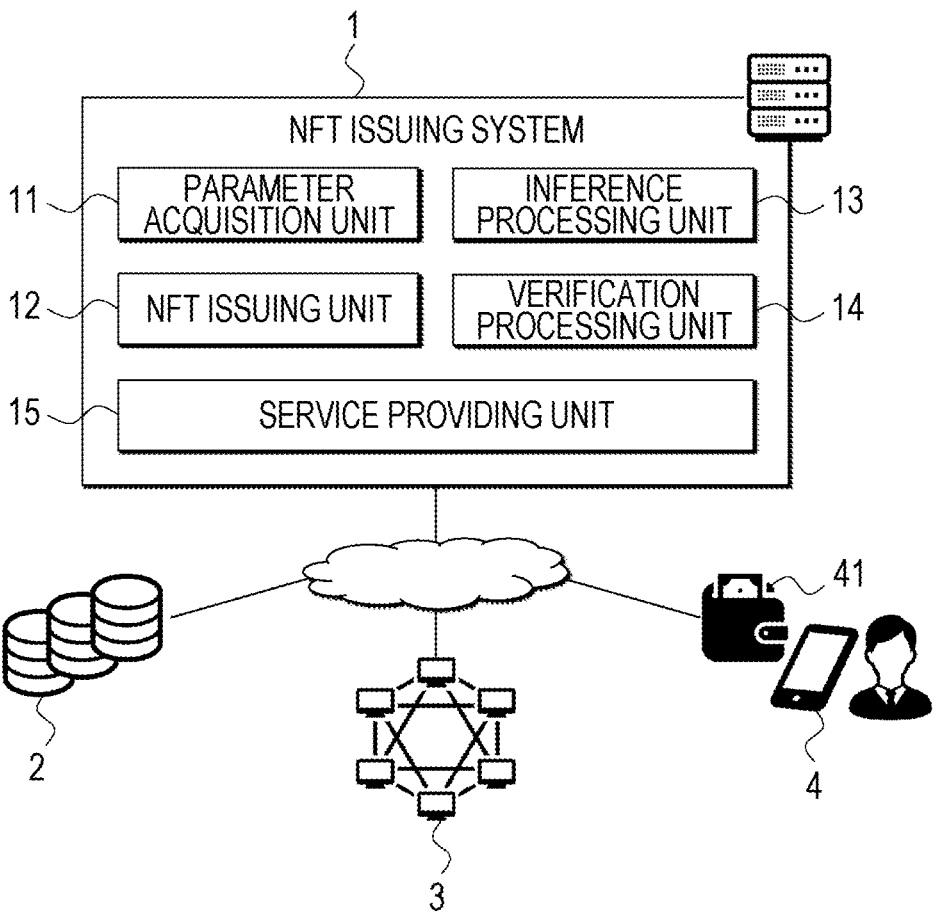
FIG. 1 is a diagram illustrating an outline of a configuration example of an NFT issuing system that is an embodiment of the present invention.

An embodiment of the present invention will be described in detail below with reference to the drawings. In all the drawings for describing the embodiment, the same parts are in principle given the same reference numerals, and duplicated description thereof will be omitted. Meanwhile, a component described with a reference numeral with reference to one drawing may be mentioned again with the same reference numeral in the description with reference to other drawings in which the component is not illustrated.

\<Outline\>

As described above, in recent years, there are systems, services, learned models, and the like that output digital content such as images/videos, stories, music/voices, games, and the like by AI with text, images, or some other digital data as an input. That is, AI is beginning to be an alternative to artists. In this case, a learned model is given a predetermined parameter to perform inference (calculation), thereby outputting digital content.

Figure 2:
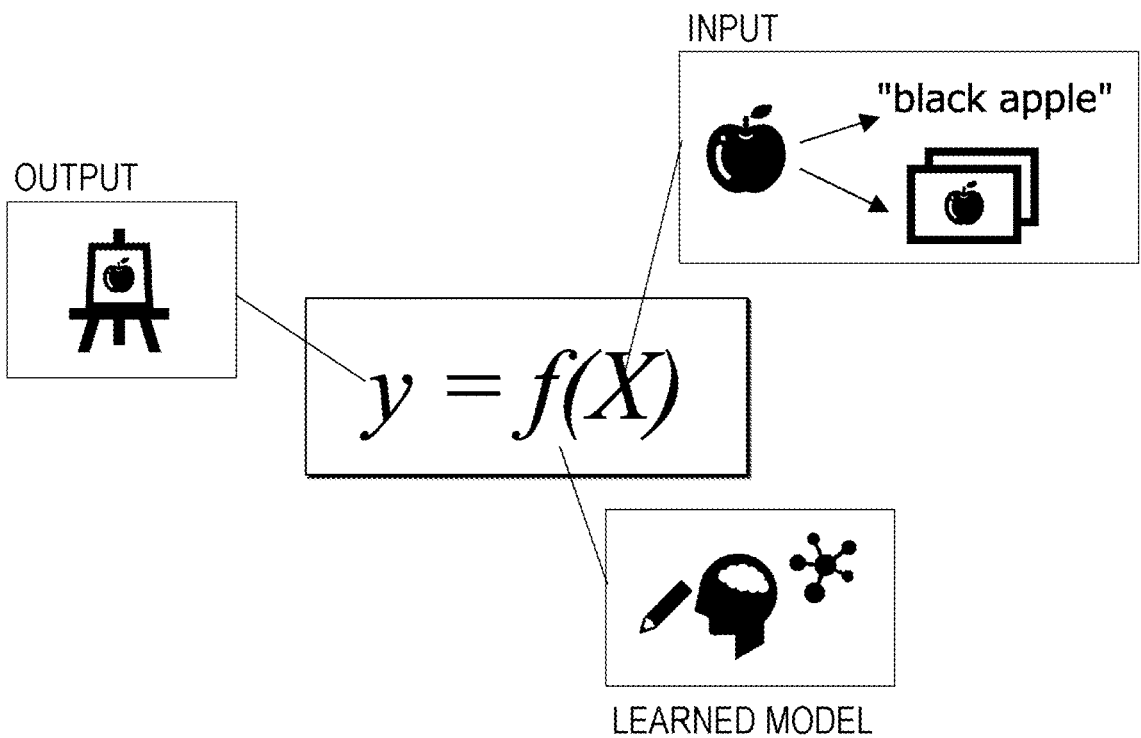
FIG. 2 is a diagram illustrating an outline of an example of a concept of outputting digital content by AI.

FIG. 2 is a diagram illustrating an outline of an example of a concept of outputting digital content by AI. The above-described processing of giving a predetermined parameter to a learned model and outputting digital content can be grasped by comparing the processing to a function operation of "y=f(X)" as illustrated in the drawing. That is, when the learned model is a function "f" and the parameter input to the learned model at the time of inference is "X", it can be said that inference "f(X)" based on "f" and "X" is to generate and output digital content "y".

Here, the parameter "X" to be input is digital information acquired from a certain motif. The example of FIG. 2 illustrates a case where text data "black apple" or image data is acquired as a parameter with "(real) black apple" as a motif. In addition, the function "f" is a learned model (information of a system or service of a specific version to which the learned model is applied is also included; the same applies hereinafter) created by a human being who is a creator by machine learning or the like. Then, the output "y" is digital content such as an image, a video, music, or the like obtained by inference of "f(X)". Being able to grasp by comparing to "y=f(X)" in this manner means that "y" can be made unique (that is, the digital content can be reproduced) when "f" and "X" are determined.

For example, in order to generate content data "y" such as an image by the learned model "f" by "txt2img" (a function of giving a sentence to a model to obtain a new image) of the above-described "Stable Diffusion", a prompt (text data instructing what content is desired to be generated for the learned model; for example, the lyrics of a song, the sentences of a novel, the lines of a cartoon, an animation, a movie, and the like) and a seed value (a large numerical value used to impart randomness to the generated content)

are generally included as the parameter "X". The same content data "y" can be reproduced by fixing the prompt and the seed value for the same learned model "f". With "img2img" (a function of giving an image and text to a model to obtain a new image), in addition to the above, image data (for example, a photograph or advertisement used for a jacket or advertisement of a music CD, and a cut scene of a comic, an animation work, or a movie work) is further included in the parameter "X".

Specifically, for example, in a case where image data is generated using a service of "Stable Diffusion", "X" includes, in addition to a prompt and image data: a sampling method (algorithm); the number of sampling steps; the number of dimensions, the shape, and the number of elements of an output tensor (for example, the size of an image); a classifier-free guidance (CFG) scale; a seed value; an instruction to use a model subjected to fine tuning or transfer learning ("embedding" or "hypernetwork"); processing (for example, noise removal, correction, and the like); setting values thereof; and the like, and when the same values are set for these pieces of data, the same image is obtained as an output.

In a conventional NFT associated with digital content, "y" which is content data output and generated in the example of FIG. 2 is stored in a distributed storage, a cloud storage, or the like, and a link for the data is embedded in a definition (smart contract or the like) of the NFT to perform association.

On the other hand, the NFT issuing system that is an embodiment of the present invention issues an NFT associated with the learned model "f" in FIG. 2 and the parameter "X" input to the learned model at the time of inference. This can eliminate the need to store individual content data "y" in a storage or significantly reduce the amount of data that must be stored.

Specifically, meta information for uniquely identifying the learned model "f" is included in the NFT. For example, link information to a learned model in a publicly available system or service that outputs digital content, or a code name or version information for identifying the learned model is included in the NFT. In addition, the parameter "X" given to the learned model at the time of inference is also included in an NFT smart contract. Alternatively, "X" may be stored in a distributed storage or the like in a JavaScript Object Notation (Json) format or the like, and link information to "X" may be included in the NFT smart contract.

By performing inference (that is, content generation) on the basis of "f" and "X" to generate content data "y", "y" can be reproduced without referring to "y" stored in the storage (or even if "y" can no longer be referred to). This can significantly compress the amount of data that must be stored, as well as reduce the risk of a single point of failure that can occur in a case where the storage storing the content data "y" associated with the NFT is not decentralized and centralized.

<Architecture>

Figure 3:
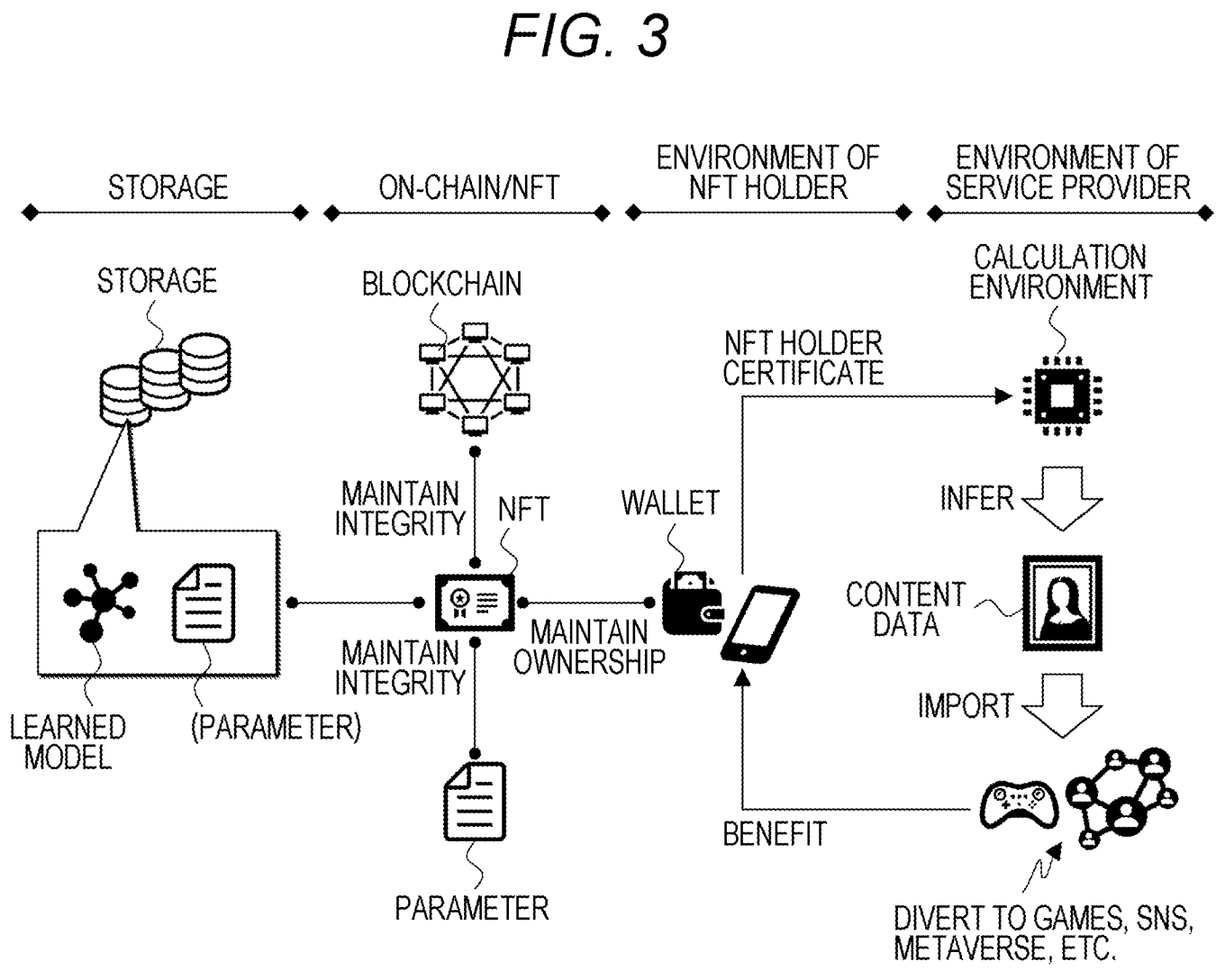

FIG. 3 is a diagram illustrating an outline of an architecture according to an embodiment of the present invention. As described above, the present embodiment has a structure in which the integrity of information defined in an NFT is maintained by the presence of the NFT on a blockchain. Then, the information of the learned model "f" and the parameter "X" used at the time of inference is included in the NFT, so that the integrity of these pieces of information is maintained. Note that, as described above, the information of the learned model "f" and the information of the parameter "X" may be configured to be stored in a storage (for example, a distributed file system such as a cloud storage or an interplanetary file system (IPFS), or the like) for reasons such as reduction of the amount of data directly included in the NFT and saving of a transaction fee (so-called "gas bill") on the blockchain. In this case, only the link information to these pieces of information is included in the NFT.

On the other hand, it is a structure in which the ownership of an NFT is maintained on the basis of a secret key (not illustrated) associated with an account of a holder of the NFT, which is managed in a wallet (application) of the holder. Then, when the holder of the NFT receives the provision of a service related to digital content, the holder of the NFT proves, to the environment of the service provider, the ownership of the NFT corresponding to the digital content by wallet cooperation or the like.

In the environment of the service provider, the learned model "f" and the parameter are specified from the target NFT and inference (calculation) is performed using the learned model "f" and the parameter "X" by a calculation environment sufficiently provided with resources necessary for inference by the learned model, and content data "y" is obtained as an inference result. Then, by importing and diverting the content data "y" to a service such as a game, a social networking service (SNS), or a metaverse, the holder of the target NFT can obtain benefits such as entertainment and economic benefits.

Note that, basically, the holder of the NFT uses the digital content "y" generated using the learned model "f" and the parameter "X" associated with the NFT. However, in response to a request of a user who is granted a right to use on the NFT or on a system related to the NFT, the digital content "y" generated using "f" and "X" associated with the NFT may be used by the user.

Furthermore, in order to sell an NFT associated with "f" and "X" used to generate a predetermined digital content "y", or the like, the target digital content "y" itself (or a copy thereof) or a simplified data conversion of the digital content "y" (for example, a thumbnail image) may be displayed on a digital content sales site, and after purchase processing by a user, processing of updating the holder information of the NFT to the user may be performed. That is, such a sales site and the NFT issuing system 1 according to the present embodiment may be configured to operate in conjunction with each other, or may be configured to be functionally included in one of them.

<System Configuration>

FIG. 1 is a diagram illustrating an outline of a configuration example of an NFT issuing system that is an embodiment of the present invention. In the present embodiment, the NFT issuing system 1 has a configuration connectable to a blockchain 3 and a storage 2 such as a cloud storage via a network such as the Internet. In addition, the NFT issuing system 1 has a configuration in which an NFT (not illustrated) on the blockchain 3 can be accessed via a wallet 41 which is an application on a user terminal 4 such as a PC or a smartphone owned by the user.

The NFT issuing system 1 is implemented by, for example, one or more server devices or information processing terminals, one or more virtual servers built on a cloud computing service, or the like, and a central processing unit (CPU) (not illustrated) executes an operating system (OS), a database management system (DBMS), middleware such as a web server program loaded on a memory from a recording device such as a hard disk drive (HDD) or a solid state drive (SSD), or software operating thereon, thereby implementing various functions related to generation and output of digital content "y" by inference based on a learned model "f" and an input parameter "X" and issuance of an NFT associated with "f" and "X".

The NFT issuing system 1 includes, for example, units such as a parameter acquisition unit 11, an NFT issuing unit 12, an inference processing unit 13, a verification processing unit 14, and a service providing unit 15 implemented as software. Note that, in the example of FIG. 1, the NFT issuing system 1 including these units is illustrated as one physical system; however, the illustration is merely logical, and in practice, some or all of these units may be implemented and operated as physically different independent systems or services, and may be configured to operate in cooperation automatically or manually by a user to realize various functions. For example, in the NFT issuing system 1, only the inference processing unit 13 and the verification processing unit 14 may be separately configured as an inference processing device and a verification processing device, respectively.

The parameter acquisition unit 11 has a function of acquiring or determining a parameter "X" to be given to the learned model "f" at the time of inference. Examples of necessary data include (1) a seed value, (2) a parameter for determining an output format or an algorithm (sampling algorithm; the number of sampling steps; the number of dimensions, the shape, and the number of elements of an output tensor; and the like), and (3) a parameter for determining the content of an inference result (general digital data typified by text, images/videos, and music; for example, in a case where a character is desired to be generated as content, text such as a character name, an image/video that is associated with the appearance of the character, music or sound representing the voice quality of the character, and the like).

For example, in a case where an NFT associated with "f" and "X" already exist on the blockchain 3 (that is, at the time of reproduction of the digital content "y"), these parameters can be acquired from the NFT. In this case, a user can indicate that the NFT is owned by the user by, for example, cooperating with his/her wallet 41 on a screen of a service using the digital content "y".

As will be described later, the NFT does not need to include all information necessary for inference and part of information may be omitted, but in this case, the omitted information may be input by the user via the user terminal 4 or may be input by the service provider, for example. Alternatively, the parameter acquisition unit 11 may perform complementation automatically on the basis of a predetermined rule or randomly. On the other hand, when there is no NFT associated with "f" and "X" (that is, in a case where digital content "y" is newly generated), all necessary information is complemented by the same method.

The NFT issuing unit 12 has a function of issuing, on blockchain 3, an NFT associated with a learned model "f" and a parameter "X" given to the learned model at the time of inference. In the present embodiment, it is assumed that the issued NFT is held at an account address of a holder in the blockchain 3. As described above, the learned model "f" associated with the NFT includes, for example, link information to a learned model in a publicly available system or service that outputs digital content, or a code name or version information for identifying the learned model, and the like, and these are included in an NFT smart contract. In addition, the parameter "X" is also included in the NFT smart contract.

The parameter "X" includes information that uniquely identifies its type and value, but the data structure is determined as desired. In addition, not all information necessary for inference may be included, and part of information may be omitted. In this case, meta information such as a name and a format for identifying the omitted information is included in the NFT, and for example, information necessary for the user may be complemented on the basis of the meta information at the time of inference. Furthermore, the parameter "X" may be configured such that the data itself is included in the NFT smart contract so as to be stored on the blockchain 3, or may be stored in an external storage 2 (including a distributed storage or a cloud storage) in a Json format or the like and included in the NFT smart contract in a form of link information to the data so that the parameter "X" can be referred to.

The inference processing unit 13 has a function of specifying a learned model "f" and a parameter "X" given to the learned model "f", performing inference (calculation) processing on the basis of the learned model "f" and the parameter "X", and outputting and generating digital content "y". As described above, with respect to the information of "f" and "X", in a case where there is an already associated NFT, the parameter acquisition unit 11 refers to the NFT (complements in a case where a part thereof is omitted), and in a case where there is no NFT, all necessary information is input or complemented and acquired. After the digital content "y" is generated, a simplified data conversion of the digital content "y" (for example, a thumbnail image) may be further generated.

The verification processing unit 14 has a function of verifying and proving an owner of digital content "y" using an NFT. When a person who illegally represents the ownership of digital content "y" output according to the present embodiment appears, it is desirable that the holder of the corresponding NFT can be proved to be the true owner of the digital content.

As described above, if learned models "f" are identical to each other, and parameters "X" input thereto are identical to each other, the same digital content can be reproduced. That is, a provider of a service (or a third party) related to digital content performs inference on the basis of a learned model "f" associated with an NFT (and a system or service to which the learned model "f" is applied) and a parameter "X", and confirms the identity between an output result data and a target digital content, whereby it can be proved that the target digital content belongs to the person who holds the NFT. At that time, for example, data such as a certificate indicating the foregoing may be output.

As another method, for example, a provider of a service (or a third party) may disclose an account address, identity information, and the like of an owner of the digital content on its own service, or may indicate that it is ensured that an NFT contract address and an output result (digital content output by inference) are associated by issuing a token/credential in a JSON Web Token (JWT) format or the like to which an identity electronic signature that ensures the verifier himself/herself or reproducibility is added.

The service providing unit 15 has a function of providing a desired service using digital content whose ownership is proved by an NFT of the present embodiment. For example, various services used by a plurality of users in a form of being identified from other users, such as an SNS, a metaverse, an online game, a free market, and a matching service, may be applicable.

The providers of these services grant the holder of the wallet 41 holding the target NFT the ownership of the corresponding digital content "y" and makes it possible to divert in their own services (the service providing unit 15). For example, in a case where the digital content "y" is an image of a character, the digital content "y" can be used as an avatar in an online game or can be used as an icon of the holder on an SNS. Furthermore, in a case where the digital content "y" is music, it is possible to play the music on the profile page of the holder on the SNS. It may be diverted as a target for display, posting, or sales. By such use, the user can enjoy benefits such as entertainment and economic benefits.

As described above, with the NFT issuing system 1 that is an embodiment of the present invention, it is possible to reproduce digital content "y" by performing inference (that is, content generation) on the basis of a learned model "f" and a parameter "X" given to the learned model at the time of inference. This can significantly compress the amount of data that must be stored for the digital content "y" and also reduce the risk of a single point of failure associated with the storage of the content data "y" associated with an NFT.

Although the invention made by the present inventors has been specifically described on the basis of the embodiment, the present invention is not limited to the above-described embodiment, and it goes without saying that various modifications can be made without departing from the gist of the present invention. The above-described embodiment has been described in detail in order to explain the present invention in an easy-to-understand manner, and the present invention is not necessarily limited to one including all the configurations described. Another configuration can be added to, deleted from, and replaced with part of the configuration of the above-described embodiment.

Part or all of the above-described configurations, functions, processing units, processing means and the like may be implemented by hardware by being designed as an integrated circuit or the like, for example. Alternatively, the above configurations, functions, and the like, may be implemented by software by a processor interpreting and executing a program that implements each function. Information such as programs, tables, and files for implementing each function can be stored in a recording device such as a memory, a hard disk, and an SSD, or in a recording medium such as an IC card, an SD card, and a DVD.

The above drawings illustrate control lines and information lines that are considered necessary for the description and do not necessarily illustrate all the implemented control lines and information lines. In reality, almost all the configurations may be considered mutually connected.

The present invention is applicable to an NFT issuing system that issues an NFT associated with content.

What is claimed is:

1. A non-fungible token (NFT) issuing system that issues an NFT related to digital content generated by inference by artificial intelligence (AI), wherein the system comprising:
   a parameter acquisition unit configured to
      acquire a parameter to be given to a learned model at a time of inference when the digital content is reproduced by the AI, or
      determine, based on a predetermined rule, a parameter to be given to a learned model at a time of inference when the digital content is reproduced by the AI; and
   an NFT issuing unit configured to issue the NFT, a smart contract of the NFT including information of the learned model and the parameter, wherein
      the parameter includes at least one of (i) a seed value used at a time of inference, (ii) a parameter for determining an output format of the digital content or an inference algorithm, and (iii) a parameter for determining the content of an inference result;
   an inference processing unit configured to acquire the learned model and the parameter from the NFT, and generate the digital content by inference by AI on a basis of the learned model and the parameter that have been acquired.

2. The NFT issuing system according to claim 1, wherein the NFT issuing unit stores at least a part of the parameter in a storage, and issues the NFT, the smart contract of the NFT including link information to the parameter instead of the parameter.

3. The NFT issuing system according to claim 1, wherein the NFT issuing unit issues the NFT, the smart contract of the NFT including meta information for identifying the parameter instead of a value for at least a part of the parameter.

4. The NFT issuing system according to claim 3, further comprising:
   an inference processing unit configured to acquire the learned model and the parameter from the NFT, complements a value of the parameter by a predetermined method on a basis of the meta information, and generate the digital content by inference by AI on a basis of the learned model and the parameter that have been acquired.

5. The NFT issuing system according to claim 1 further comprising:
   an inference processing unit configured to compare desired first digital content with second digital content generated by inference by AI on a basis of the learned model and the parameter acquired from the NFT, and output that an owner of the first digital content is an owner of the NFT when the first digital content is identical to the second digital content.

6. A method of issuing a non-fungible token (NFT) related to digital content generated by inference by artificial intelligence (AI), the method comprising:
   acquiring a parameter to be given to a learned model at a time of inference when digital content is reproduced by the AI, or determining, based on a predetermined rule, a parameter to be given to a learned model at a time of inference when the digital content is reproduced by the AI; and
   issuing the NFT, a smart contract of the NFT including information of the learned model and the parameter, wherein
   the parameter includes at least one of (i) a seed value used at a time of inference, (ii) a parameter for determining an output format of the digital content or an inference algorithm, and (iii) a parameter for determining the content of an inference result; and
   acquiring the learned model and the parameter from the NFT, and generating the digital content by inference by AI on a basis of the learned model and the parameter that have been acquired.

* * * * *